April 16, 1940.  J. L. GILMORE  2,197,267
TRAILER COUPLER
Filed Aug. 3, 1936
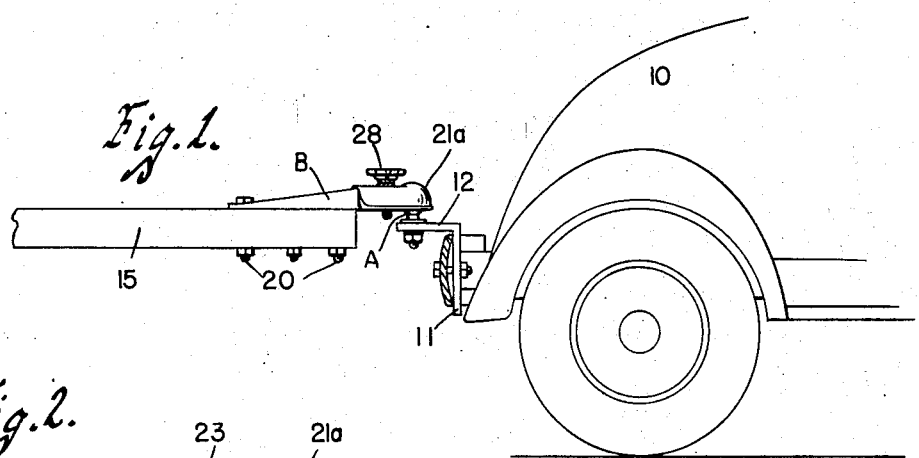
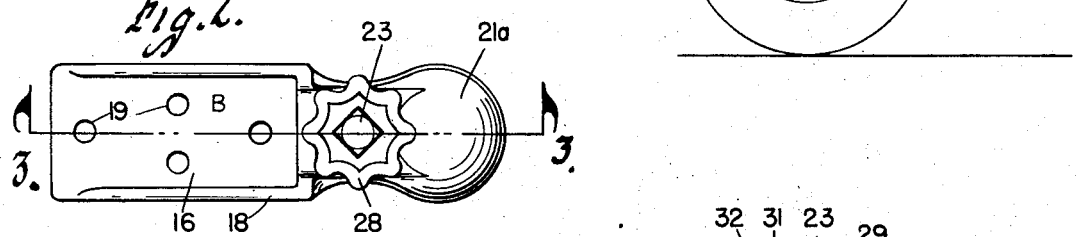
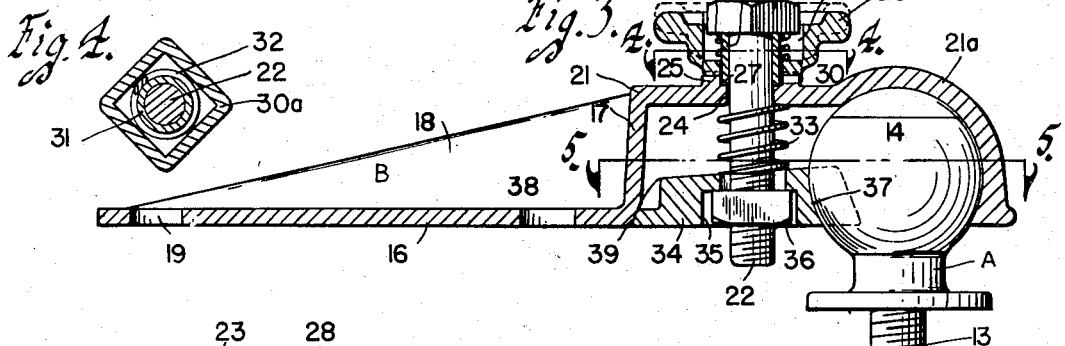
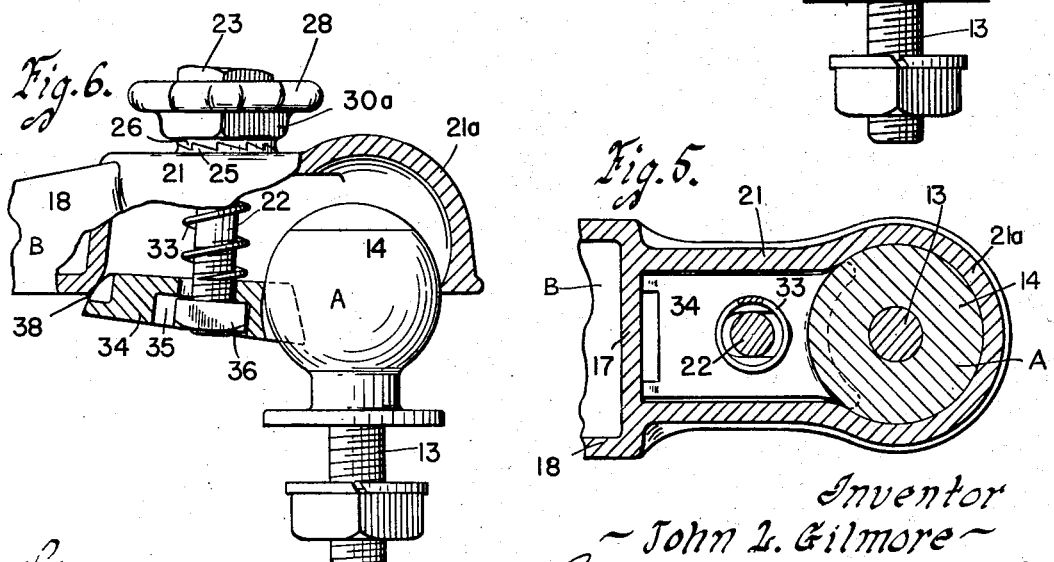
Inventor
John L. Gilmore
by Bair, Freeman & Sinclair
Attorneys
Witness
H. S. Whingenmaier Patented Apr. 16, 1940

2,197,267

UNITED STATES PATENT OFFICE 2,197,267

TRAILER COUPLER

John L. Gilmore, Kansas City, Mo.

Application August 3, 1936, Serial No. 94,051

4 Claims. (Cl. 280—33.17)

My present invention relates to a coupler or hitch for connecting a trailer to a motor vehicle.

It is my object to provide a trailer coupler of very simple construction, having a minimum number of parts, which can be economically made by factory processes.

A further object is to provide such a device, the parts of which can be conveniently and easily installed on a motor vehicle and trailer.

More particularly, it is my object to provide a novel form of lock for connecting together the hitch member on the motor vehicle and the hitch member on the trailer. I have provided a lock which can be operated with one hand and have a locking block which when in use is drawn within the outline of a protecting casting and is thoroughly braced against the casing so as to make a very sturdy and efficient construction.

With these and other objects in view, my invention consists in the construction, arrangement and combination of the various parts of my trailer coupler, whereby the objects contemplated are attained, as hereinafter more fully set forth, pointed out in my claims, and illustrated in the accompanying drawing, in which:

Figure 1 is a side elevation of a trailer coupler embodying my invention installed on a motor vehicle and a trailer, of which parts only of the vehicle and trailer are shown.

Figure 2 is a top or plan view of the member of the coupler intended to be installed on the trailer.

Figure 3 is a detail, sectional view taken on the line 3—3 of Figure 2, showing both members of the coupler.

Figure 4 is a horizontal, detail, sectional view taken on the line 4—4 of Figure 3.

Figure 5 is a horizontal, detail, sectional view taken on the line 5—5 of Figure 3; and Figure 6 is a vertical, sectional view, parts being broken away and parts being shown in section, the view being somewhat similar to that of Figure 3, but showing the parts in unlocking position.

In the drawing, I have used the reference numeral 10 to indicate generally a motor vehicle, having for example the bumper 11 to which is secured a rearwardly projecting short bar 12, having a hole extending through it.

Secured to the bar 12 is the downwardly extending shank 13 on a ball 14, forming a member for a ball and socket joint. This member is of known construction.

For convenience, I have called the coupler member which is connected to the motor vehicle the coupler member A.

The coacting coupler or hitch member, which is intended to be connected to the draw bar 15 of the trailer is indicated generally at B.

The coupler B comprises a flat plate 16, having a front, upwardly extending wall 17 and side walls 18 which are tapered from their front ends rearwardly as perhaps best shown in Figure 3.

The plate 16 has a series of holes 19 to receive bolts 20 for fastening the coupler member B to the trailer draw bar.

Formed integral with the parts just described is a forwardly extending, downwardly opening shell 21, the forward part of which, as indicated at 21a, forms a downwardly opening socket for the ball and socket joint.

Rearwardly of the socket portion 21a, the shell is open, as indicated for instance in Figure 3, to the wall 17, which forms the rear wall of the shell. The parts are so arranged that the ball 14 may be inserted into the socket 21a of the shell 21, as illustrated in Figure 3.

For conveniently and easily locking the ball 14 in the socket 21a, I provide a bolt 22, preferably with the angular head 23. The bolt is extended through a hole 24 in the upper part of the shell 21, to have a loose fit that will allow some rocking of the bolt.

Around the hole 24 on top of the shell 21 is an annular rib 25 (see Figure 3) having teeth 26 on top and having a ratchet 27 surrounding the hole 24.

Mounted on the upper shank of the bolt 22 is a floating ratchet head 28, having at its upper portion an angular socket 29 to receive the head 23. The socket is angular in horizontal section to fit the bolt head and below the socket is a portion 30 of reduced diameter to receive the shank of the bolt 22.

Mounted on the bolt shank is a bushing 31 which is seated in the rabbet 27. Instead of the separate bushing 31 the bolt 22 may be formed with an integral enlarged shoulder part which would serve the same function as the bushing. I prefer the bushing because with it, it is easier to get a machined surface.

Between the bottom of the socket 29 and the head 23 is a coil spring 32, which normally tends to push up on the head 23 and downwardly on the head 28, so that the head 23 will project above the socket 29.

Thus when the bolt head 23 is pushed downwardly as far as it will go, its downward movement will be limited by the bushing or sleeve 31.

The floating ratchet head 28 floats on the bolt shank as will be hereinafter more fully referred to.

On the bolt shank below the top of the shell 21 is a coil spring 33. Loosely received on the lower end of the shank of the bolt 22 is the locking block, indicated generally at 34, having at its under side the socket 35 to receive the nut 36 on the bolt.

The forward face 37 of the block 34 is shaped to fit the ball 14. The rearward face is inclined from its top downwardly and rearwardly as indicated at 38.

In assembling the parts, the spring 32 may be placed on the bolt shank and the floating ratchet head 28 may be also installed on the bolt shank. The under side of the portion 30 has the teeth 30a to coact with the teeth 26 on the shell 21. The bushing 31 may be set in the ratchet 27 and the bolt shank may then be slipped downwardly through the bushing and through the hole 24. The spring 33 is then slipped onto the bolt.

The locking block 34 is then slipped over the lower end of the bolt with the ratchet 35 down and the face 37 forwardly, and the nut 36 is started on the bolt.

The parts will then assume approximately the position shown in Figure 6 with the block 34 projecting downwardly somewhat from the casting forming the shell 21, so that the upper part of the beveled face 38 engages the front face of the wall 17 and the block 34 is permitted to swing rearwardly enough to permit the insertion of the ball 14 past the front face 34 of the locking block into the socket member 21a.

The operator then rotates the floating ratchet head 28.

The angular socket 29 will receive the angular head 23, and the bolt will thus be rotated.

The socket 35 is angular so as to prevent rotation of the nut 36. Therefore the bolt will be screwed into the nut 36 for thus forcing it and the locking block 34 upwardly on the bolt and into the shell 21, until the front face 37 of the block 34 snugly engages the lower half of the ball 14. This snug engagement will occur at about the time the lower face of the surface of the block 34 is on a level with the lower face of the plate 16.

Thus when the parts are in locking position, the locking block will have been drawn into the shell 21 and will be protected thereby.

The parts are so constructed that when the locking block 34 is in full locking position as shown in Figure 3, the spring 32 will hold the floating ratchet head 28 in interlocking engagement with the head 30a on the shell 21, but the floating ratchet head will not be at the upper limit of its floating or sliding movement on the bolt.

It will be observed that when the parts are thus in their locking position, the lower part of the rear face 38 will snugly engage the lower part of the front face of the wall 17, which may, if desired, be slightly beveled at 39 to fit the face 38.

Thus any force exerted by the ball 14 in a rearward direction against the locking block 34 will be imposed almost entirely on the wall or partition 17 and to very little degree on the bolt 22.

If then it is desired to unlock the coupler, the operator seizes the floating ratchet head 28 and pulls it upwardly against the tension of the spring 32 (Figure 3) until the teeth 30a on the floating ratchet head clear the teeth 26 on the shell 21 and rotate the floating ratchet head to the left.

The engagement of the angular socket 29 of the floating ratchet head with the angle head 23 of the bolt 22 will cause the bolt 22 to rotate with the ratchet head for screwing the bolt out of the nut 36.

When this operation is continued long enough, the locking block 34 will be forced downwardly by the spring 33 far enough to permit the withdrawal of the ball 14.

A coupler of the kind herein explained has numerous advantages, some of which I have already mentioned.

The parts are of very simple and inexpensive construction.

The process of assembling them into the completed device is simple and easy.

In the completed device, the locking block 34 is completely received within the under side of the shell 21 when the device is in locking position. This affords protection to the locking block, which prevents damage to the block from external blows.

The construction and arrangement of the locking parts are such that the operator must lock the two coupler members together in order to enable the trailer to be pulled, and he practically c·· not fail to do so if he starts the locking operation of the floating ratchet head.

A great advantage in a trailer coupler of this kind arises from the fact that the lock can be manipulated with one hand and can be operated without removing a mitten or glove. This is particularly important in bad weather.

Changes may be made in the construction and arrangement of the parts of my improved trailer coupler, and it is my intention to cover by my claims any such changes or modifications in arrangement or materials used, which may be within the scope of such claims and of my invention.

I claim as my invention:

1. In a trailer coupler, a coupler member having a ball, a second coupler member having a shell, one portion of which forms a socket to receive the ball, a block movable toward and from position for forming part of the ball holding socket, means for moving the block to its different positions, comprising a bolt slidably mounted in the shell, and a spring on the bolt between the block and the shell, said shell having ratchet teeth and a floating ratchet, said floating ratchet having teeth to cooperate with the teeth of the shell and adapted to be moved lengthwise on the bolt, said bolt and ratchet head having coacting parts, whereby when the ratchet head is in one position of its movement it may rotate with relation to the bolt, and when it is in another position, it is non-rotatable on the bolt.

2. In a trailer coupler, a coupler member having a ball, a second coupler member having a shell, one portion of which forms a socket member for receiving the ball, a locking block adapted in one position to form a part of the socket and when in such position to be received within the shell, said locking block having a recess in its lower face, a bolt loosely extended through the locking block having a nut threaded on its lower end and received within said recess, a spring between the locking block and the shell, said bolt being loosely extended through the shell wall, said shell having ratchet teeth, said bolt having a head, a bushing on the bolt between the head and the shell, a floating ratchet head slidably mounted on said bushing, having teeth to engage said first teeth, and having in its upper face a socket to receive the bolt head, a spring between the ratchet head and the bolt head, the ratchet head being adapted to turn the bolt when the head of the bolt is received in the socket in the ratchet head and adapted to rotate on the bolt when the bolt clears such socket.

3. In a trailer coupler a pair of engaging coupler members comprising respectively a hollow shell and a ball fitting therein, a locking block adapted to be drawn into the hollow shell against the ball to hold it in place and means for positioning and locking said block comprising a bolt loosely extending through the shell and the block having means thereon for drawing said block against the ball including a handle member mounted above the shell, said handle member having an aperture therein adapted to receive the bolt head in non-rotatable relation thereto and having a ratchet element at the lower face and a coacting ratchet element on the adjacent surface of the shell, a bushing surrounding the bolt within the handle spacing the bolt head above the bottom of said aperture, and a coiled spring acting between the bolt head and the handle constantly urging the ratchet elements into engagement.

4. In a trailer coupler a pair of engaging coupler members comprising respectively a hollow shell and a ball fitting therein, a locking block adapted to be drawn into the hollow shell against the ball to hold it in place and means for positioning and locking said block comprising a bolt loosely extending through the shell and the block having means thereon for drawing said block against the ball including a handle member mounted above the shell, said handle member having means forming a releasable engagement with the bolt for holding said handle member and said bolt normally in non-rotatable relationship, a ratchet element at the lower face of said handle member, a coacting ratchet element on the adjacent face of the shell, and a coiled spring cooperable with said handle member and said body through said bolt for constantly urging the ratchet elements into engagement.

JOHN L. GILMORE.